United States Patent
Van Elburg et al.

(10) Patent No.: US 8,230,109 B2
(45) Date of Patent: Jul. 24, 2012

(54) SYSTEM AND METHOD FOR HANDLING A SESSION INITIATION PROTOCOL MESSAGE IN A COMMUNICATIONS NETWORK

(75) Inventors: Johannes Van Elburg, Oosterhout (NL); Christer Holmberg, Kirkkonummi (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 12/811,627

(22) PCT Filed: Jan. 10, 2008

(86) PCT No.: PCT/EP2008/050258
§ 371 (c)(1),
(2), (4) Date: Dec. 16, 2010

(87) PCT Pub. No.: WO2009/086935
PCT Pub. Date: Jul. 16, 2009

(65) Prior Publication Data
US 2011/0119340 A1    May 19, 2011

(51) Int. Cl.
  *G06F 15/173*    (2006.01)
  *G06F 15/16*    (2006.01)
(52) U.S. Cl. ........................ 709/238; 709/236
(58) Field of Classification Search .................. 709/236, 709/238–244
See application file for complete search history.

(56) References Cited

PUBLICATIONS

Barnes M et al: "An Extension to the Session Initiation Protecol (SIP) for Request History Information; rfc4244. txt" IETF Standard, Internet Engineering Task Force, IETF, CH, Nov. 1, 2005 chapters 1, 3, 2-4 Appendix.
Rosenberg Cisco J: "Applying Loose Routing to Session Initiation Protocol (SIP) User Agents (UA): draft-rosenberg-sip-ua-loose-route-OI.txt" IETF Standard-Working-Draft, Internet Engineering Task Force, IETF, CH, No. 1, Jun. 12, 2007 chapters 1-3, 4.1, 4.2, 5.
Elwell Siemens R Jesske Deutsche Telekom J McMillen Avaya Inc J: "SIP Reason header extension for indicating redirection reasons; draft-elwell-sipping-redirection-reason-OI.txt" IETF Standard-Working-Draft, Internet Engneering Task Force, IETF, CH, No. 1, Oct. 1, 2004 chapters 1-4.
Garcia-Martin Ericsson E Henrikson Lucent D Mills Vodafone M: "Private Header (P-Header) Extensions to the Session Initiation Protocol (SIP) for the 3rd-Generation Partnership Project (3GPP); rfc3455.txt" IETF Standard, Internet Engineering Task Force, IETF, Ch. 1 Jan. 2003 chapter 4.2.

*Primary Examiner* — Patrice Winder
*Assistant Examiner* — Julian Chang

(57) ABSTRACT

A method and apparatus for handling a Session Initiation Protocol message in a communications network. When a network node receives a Session Initiation Protocol message, which comprises Request-URI header, the node rewrites the Request-URI header in the SIP message, and adds information to the SIP message useable by a remote node to determine the current target address of the message. The SIP message is then sent to a further node. In this way, the remote node that receives the message can determine the current target in the SIP message, even if the target has been re-written in the Request-URI as the result of, for example, a translation or re-routing operation.

4 Claims, 3 Drawing Sheets

SYSTEM AND METHOD FOR HANDLING A SESSION INITIATION PROTOCOL MESSAGE IN A COMMUNICATIONS NETWORK

TECHNICAL FIELD

The present invention relates to Session Initiation Protocol message handling in a communications network.

BACKGROUND

IP Multimedia Subsystem (IMS) is the technology defined by the Third Generation Partnership Project (3GPP) to provide IP Multimedia services over mobile communication networks (3GPP TS 22.228). IMS provides key features to enrich the end-user person-to-person communication experience through the integration and interaction of services. IMS allows new rich person-to-person (client-to-client) as well as person-to-content (client-to-server) communications over an IP-based network.

The IMS makes use of the Session Initiation Protocol (SIP) to set up and control calls or sessions between user terminals (UEs) or between UEs and application servers (ASs). SIP is described in RFC3261. The Session Description Protocol (SDP), carried by SIP signalling, is used to describe and negotiate the media components of the session. Whilst SIP was created as a user-to-user protocol, IMS allows operators and service providers to control user access to services and to charge users accordingly.

Within an IMS network, Call/Session Control Functions (CSCFs) operate as SIP entities within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

IMS service functionality is implemented using application servers (ASs). For any given UE, one or more ASs may be associated with that terminal. ASs communicate with an S-CSCF via the IMS Service Control (ISC) interface and are linked into a SIP messaging route as required (e.g. as a result of the triggering of IFCs downloaded into the S-CSCF for a given UE).

A user registers in the IMS using the specified SIP REGISTER method. This is a mechanism for attaching to the IMS and announcing to the IMS the address at which a SIP user identity can be reached. In 3GPP, when a SIP terminal performs a registration, the IMS authenticates the user using subscription information stored in a Home Subscriber Server (HSS), and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling, and charging for, user access to IMS-based services. Operators may provide a mechanism for preventing direct user-to-user SIP sessions that would otherwise bypass the S-CSCF.

Further signalling sent to and from the user is also controlled using SIP signalling. Each SIP client between the two end-points of the signalling uses the Domain Name System (DNS) to route the signalling and find the next hop to route the request. SIP uses several mechanisms for routing requests between hops. One of the key mechanisms used is rewriting the Request-URI in he header of the SIP message to the next hop to which the request will be routed. This will cause the original target identity in the header to be replaced with an address of an intermediate hop. The original target address is lost, and this can cause problems in scenarios where the receiver requires knowledge about the target address that was used to address that receiver.

For example, in the case where a single User Agent (UA) has multiple addresses associated with it, a single address is registered and the UA would accept incoming signalling sent to any of the associated addresses. It is desirable for the UE to know which of the addresses is being used when it receives, for example, a call, as it may play different ring tones depending on which address was used by the originator of the call. However, if the Request-URI is re-written then UA will not know which address was used to make the call.

Another example where the problem arises is in making a call for emergency services using Voice over IP (VoIP). A SIP INVITE request for an emergency must be marked to indicate that it is an emergency call in order that it can receive priority treatment. The marking is made to the target address of the request itself, to identify the target as being a recipient of emergency service calls. The Request-URI contains an SOS URN, which must remain in the Request-URO as the request is routed towards the emergency services target. However, this is lost if any of the intermediate nodes re-write the Request-URI.

More examples of scenarios where re-writing the request causes a problem can be found in internet draft IETF draft-rosenberg-sip-ua-loose-route-01. The cases where Request-URI rewrites occur are as follows:

Retarget: In this case, the Request URI contains a new target address, and so the end target is no longer the original end target;

Reroute: In this case, the target address remains the same but a different or intermediary route is chosen to reach the same user, and so the Request-URI is rewritten to contain the routing address Translation: In this case a name (URN) is translated to an address.

The problem described above has been partly addressed by using the Route header, together with loose routing (http://tools.ietf.org/html/rfc3261). According to loose routing, the Request-URI is not overwritten, and so it will always contains the URI of the target UA. The SIP request is sent to the URI in the topmost Route header field, and so the Request-URI does not always contain the URI of the next hop to which the request will be sent. Effectively, the request target and the next route destination are kept separate in the SIP request header.

Another part of the problem has been solved on the last hop from a home proxy to the UA, in which a P-Called-Party-ID header retains the Request-URI value which had been replaced by the contact address of the registered user (see http://tools.ietf.org/html/rfc3455).

The internet draft (http://tools.ietf.org/html/draft-rosenberg-sip-ua-loose-route-01) proposes to extend the routing mechanism by extending the loose routing concept to the UE. However, there are several problems with this that need to be addressed. A simple extension of loose routing to UEs would not work unless the target node for the next physical hop supports loose routing. Each entity in the path must therefore know that the next-hop entity supports loose routing. If previous entities in the signalling path have used the loose routing mechanism, and an entity realizes that the next hop does not support it, it must "fix" the message by restoring the correct value back into the R-URI in order for that next hop to be able to process and route the message correctly.

Furthermore there are services that rely on receiving entities having knowledge of the "previous" R-URI that will only work if entities (which have nothing to do with the service as such) in the message path support the mechanism, which makes the usage of such services very limited and unpredictable.

Examples of scenarios in which the application of the loose routing mechanism to UEs would make the SIP routing fail include the following:

1. An intermediate SIP proxy (such as a Call Session Control Function in an IMS network) that does not support the loose routing mechanism. Such a SIP proxy would receive a Route header with one entry representing the proxy, and remove the Route entry. The proxy would then attempt to route the message based on the Request URI, using RFC 3263 procedures, and find the first proxy that the target identity resolves to. This would result in a loop back to the first proxy that the target normally resolves to, and so consequently routing would fail.

2. A Home SIP proxy that does not support the mechanism. In this case the home SIP proxy would receive a Route header with one entry representing the Home SIP proxy and remove the Route entry. The Home proxy would then analyse the Request URI to see if it is a registered Address of Record (AoR). Of course, it will not be and so the Home SIP proxy will attempt to route the message based on the Request URI, using RFC 3263 procedures. It will find the first proxy that the target identity resolves to, resulting in a loop back to the first proxy that the target normally resolves to, and so consequently routing would fail.

3. A Media Gateway Control Function (MGCF) that receives a request that has been routed using the loose routing mechanism may find a Uniform Resource Name (URN) in the Request URI. The MGCF cannot interwork with the URN and so call setup fails.

SUMMARY

The inventors have realised the problems associated with extending the loose routing mechanism, and devised a method and apparatus to address this.

According to a first aspect of the invention, there is provided a method of handling Session Initiation Protocol message in a communications network. A network node receives a Session Initiation Protocol (SIP) message, which comprises Request-URI header. The node rewrites the Request-URI header in the SIP message, and adds information to the SIP message useable by a remote node to determine the current target address of the message. The SIP message is then sent to a further node. In this way, any remote node that receives the message can determine the current target in the SIP message, even if the target has been re-written in the Request-URI as the result of a translation or re-routing operation. The information may include, for example, information identifying the current target identity or information identifying where a Request-URI has been re-written as a result of a re-target operation. The current target address may optionally be the original target address of the message or, in the case where the Request-URI has been re-written owing to a retarget operation, the current target address is the address as re-written by the retarget operation.

Optionally the information useable by the remote node to determine the current target address of the message comprises a new message header, the header including the current target identity. This is referred to herein as a "Target" header. In an alternative embodiment, the information useable by the remote node to determine the current target address of the message comprises a tag associated with the entry in a History-Info header of the message. The tag indicates that the entry arose from a re-target operation. In this case, the node optionally removes existing tags associated with previous target address entered in the History-Info header, and associates a tag with the current target address entered in the History-Info header. This reduces the size of the SIP message.

According to a second aspect of the invention, there is provided an intermediate node for use in a communications network. The intermediate node, which may be a SIP proxy such as an IMS Call Session Control Function, comprises a receiver for receiving a Session Initiation Protocol message. A processor is provided for rewriting a Request-URI header in the SIP message and adding information to SIP message useable by a remote node to determine the current target address of the message. The intermediate node further comprises a transmitter for sending the SIP message to a further node. By providing the information, a remote node can determine the current target address even if the target has been re-written in the Request-URI as the result of a translation or re-routing operation.

The processor is optionally arranged to insert a new message header in the SIP message, the header including the current target identity. Alternatively, the processor is optionally arranged to add a tag to an address entry in a History-Info header of the message, the tag indicating that the entry arose from a re-target operation. In a further alternative, the processor is arranged to add a tag to an address entry in a History-Info header of the message, the tag indicating that the entry contains a target address of the message.

According to a third aspect of the invention, there is provided a node for use in a communications network, the node comprising a receiver for receiving a SIP message, and a processor for determining, on the basis of information added to the message by an intermediate node between an originating node and the node, the current target address of the message. The node can therefore determine the current target address of the SIP message even if the target has been re-written in the Request-URI as the result of a translation or re-routing operation by an intermediate node. The node may be a terminating node such as User Equipment, or may be an intermediate node such as an Application Server.

Optionally, the processor is arranged to determine the current target address of the message by determining the contents of a target header inserted in the message by the intermediate node prior to sending the message to the node. In an alternative option, the processor is arranged to determine the current target address of the message by analysing tagged entries in a History-Info header of the message.

DETAILED DESCRIPTION

Figure 1:
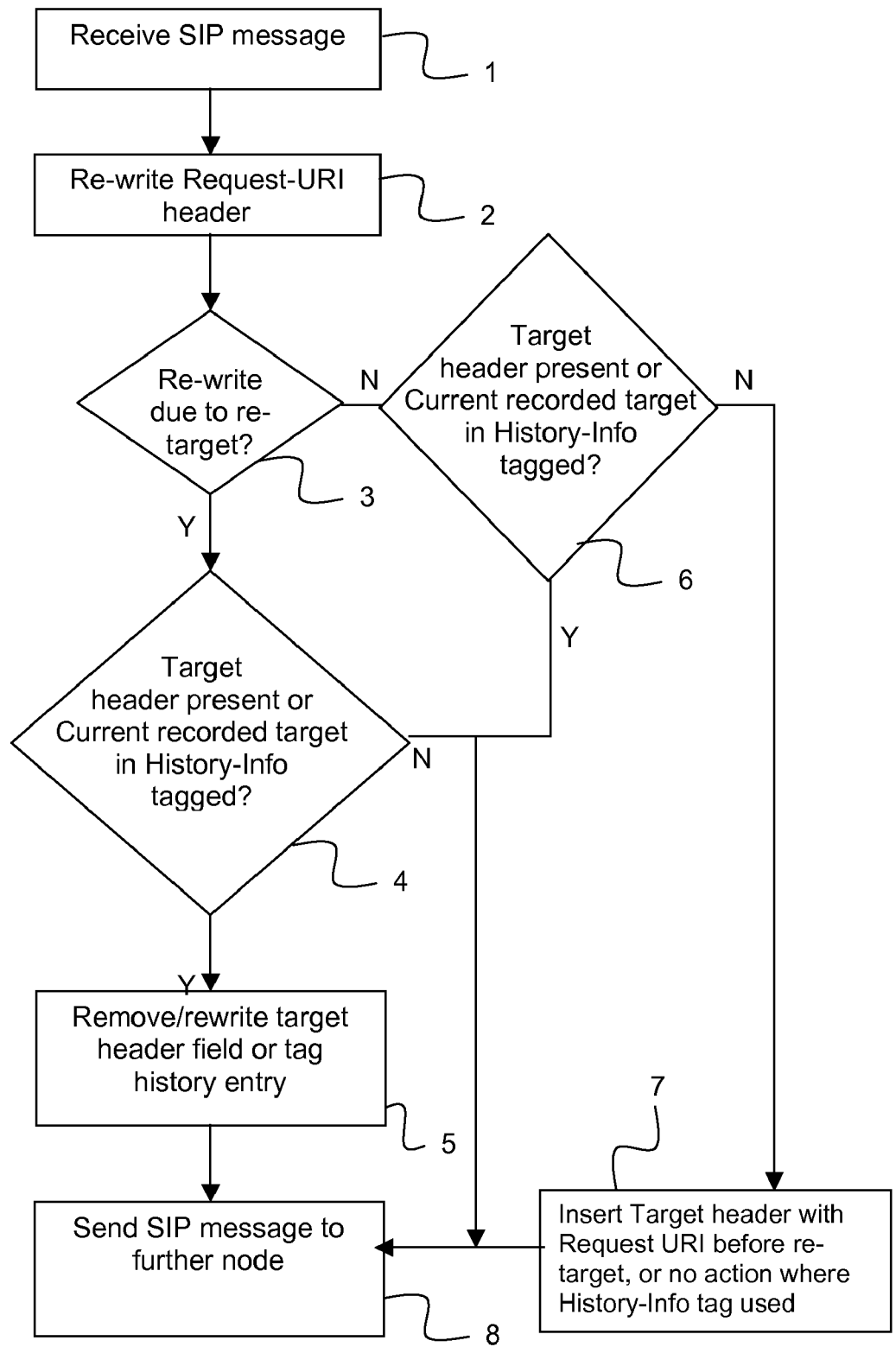
FIG. 1 is a flow diagram illustrating the basic steps of an embodiment of the invention.

In order to overcome the problems described above, it is proposed that a SIP message retains the original target information in a separate information element from the Request-URI. Ways in which this can be achieved include introducing a new SIP header, and extending the usage of the existing History-Info header.

New Target SIP Header

A new header, referred to herein as a "Target" header, is inserted into a SIP message by a SIP entity whenever the Request-URI is rewritten by the SIP entity (assuming that a Target header is not already present in the SIP message), and the rewriting is due to a rerouting of the request. If the Target header is already present in the SIP message, and the Request-URI is rewritten due to a retarget operation, then the Target header is rewritten with the new target. The Target header includes the initial target identity that was used to generate the message. In a further alternative, the Target header is removed in the case of retargeting.

If the Target header is available on the request and the Request-URI is rewritten due to a re-route or translation operation, the Target header will be left unchanged.

For all alternatives in this embodiment, a receiving entity that receives a SIP message containing a Target header can determine the current target from the Target header field.

Furthermore, for all alternatives in this embodiment a receiving entity that receives a SIP message not containing a Target header can determine the current target from the Request-URI.

If a SIP entity, which acts as registrar/home proxy for the terminating user, re-writes the Request-URI with the contact address of the registered UA it may additionally insert a P-Called-Party-ID header field with the previous value of the Request-URI, as described in RFC3455.

Note that the Target header field and P-Called-Party-ID header fields have different semantics. Where the Target header field represents the initial target identity that was used to initiate a session to the target, the P-Called-Party-ID represents the last AoR used to reach the user before Request-URI value for cases where the last route taken presents significant information.

Extending History-Info Usage

The History-Info header (RFC4244) is a blind record of values that a Request URI has had in the course of the message being routed. Consequently this header also contains the target for the current request.

An alternative to the new Target header solution described above is to extend the use of the History-Info header by marking the entry in the History-Info header recording the current target of the request. When a SIP message traverses a SIP entity supporting this extension and the SIP entity re-writes the Request-URI value due to a retarget operation, the SIP entity adds the previous Request-URI value into an entry of the History-Info header field and additionally it tags that entry as a retarget entry. In order for a receiving entity to determine which History-Info header entry is pointing towards the intended target, it can lookup the last History-Info entry that is tagged as being due to a retarget operation, or when no entry is tagged, to use the first entry. The sequence of tagged entries provides a target trail as a meta level in the history.

In a further alternative, only the current target of the request is marked. When a SIP message traverses a SIP entity supporting this extension and the SIP entity re-writes the Request-URI value due to a retarget operation, the SIP entity adds the previous Request-URI value into an entry of the History-Info header field and additionally it tags that entry as a retarget entry. The SIP entity additionally removes such tags from previous History-Info elements. In order for a receiving entity to determine which History-Info header entry is pointing towards the intended target, it can lookup the last History-Info entry that is tagged as being due to a retarget operation, or when no entry is tagged to take the first entry.

In a further alternative mechanism, only re-targets are recorded in the History-Info header, although that may be incompatible with SIP elements that implement the current RFC4244. In order for a receiving entity to determine the current target, it looks up the last History-Info entry.

For all alternatives in this embodiment, a receiving entity that receives a SIP message not containing a History-Info header can determine the current target from the Request-URI.

If the SIP entity acts as registrar/home proxy for the terminating user, it re-writes the Request-URI with the contact address of the registered UA and it may additionally insert a P-Called-Party-ID header field with the previous value of the Request-URI, as described in RFC3455.

The alternative embodiments described above can be summarized in the flow diagram of FIG. 1, with the following numbering corresponding to the numbering in the Figure:

1. A SIP message is received at a SIP proxy node, for example a CSCF in an IMS network;
2. The node re-writes the Request-URI header of the SIP message;
3. The node checks to see if the Request-URI rewrite is due to a retarget operation. If so, then move to step 4, if the retarget is due to a reroute or translation operation, then move to step 6;
4. Where the target header embodiment is used, check to see if a target header is already present in the SIP message. If so, then move to step 5, if not then move to step 8. Where the History-Info header embodiment is used, the node checks to see if the current recorded target is tagged in the History-Info header. If so, then move to step 5, if not then move to step 8;
5. Where the target header embodiment is used, the target header is either removed or rewritten with the new target, then move to step 8. Where the History-Info header embodiment is used, the history entry that represents the new current target is tagged. Additionally a tag may be removed from a previously tagged entry. Then move to step 8;
6. Where the target header embodiment is used, check to see if a target header is already present in the SIP message. If so, then move to step 8, if not then move to step 7. Where the History-Info header embodiment is used, the node checks to see if the current recorded target is tagged in the History-Info header. If so, then move to step 8, if not then move to step 7;
7. Where the target header embodiment is used, a target header is inserted into the SIP message with the Request URI value before the retarget operation. Where the History-Info header embodiment is used, no further action is required.
8. The SIP message is sent to a further node in the communications network.

Figure 2:
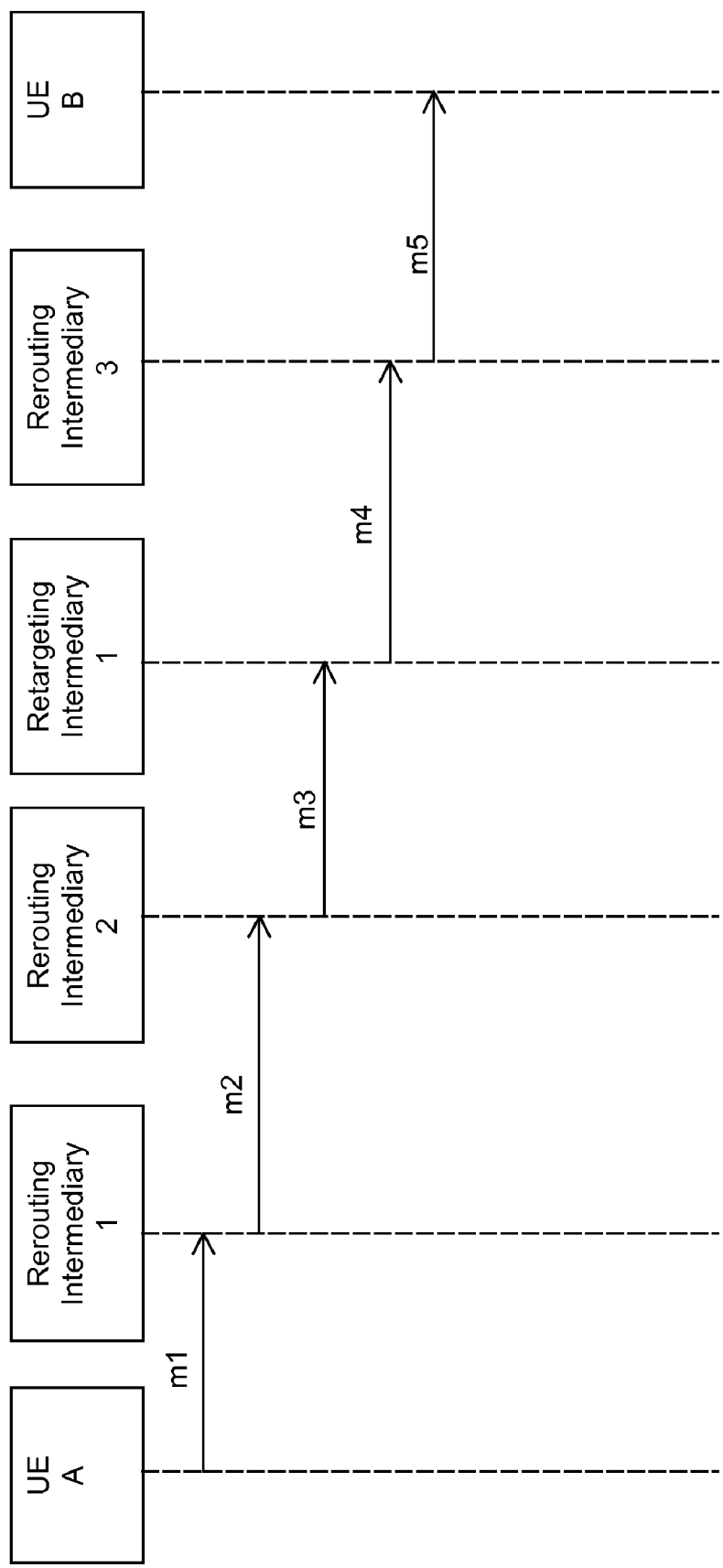
FIG. 2 is a signalling diagram showing example signalling according to embodiments of the invention.

Referring to FIG. 2, an example signalling diagram is shown. Where the target header embodiment is used, message 1 from UEA to rerouting intermediary 1 is a SIP INVITE message including target1 in the Request URI. The following correspond to the route and target for each message in the signalling sequence:

| m1 | INVITE |
| --- | --- |
|    | target1 |
| m2 | INVITE route1 |
|    | Target: target1 |
| m3 | INVITE route2 |
|    | Target: target 1 |
| m4 | INVITE target2 |
| m5 | INVITE route3 |
|    | Target: target2 |

In another target header embodiment, the signalling sequence shown in FIG. 2 is as follows:

| m1 | INVITE |
| --- | --- |
|    | target1 |
| m2 | INVITE route1 |
|    | Target: target1 |
| m3 | INVITE route2 |
|    | Target: target 1 |
| m4 | INVITE target2 |
|    | Target: target 2 |
| m5 | INVITE route3 |
|    | Target: target2 |

Where the History-Info header is used, an example the signalling sequence according to FIG. 2 is as follows:

| m1 | INVITE |
| --- | --- |
|    | target1 |
| m2 | INVITE route1 |
|    | History-Info: |
|    |     <target1>;index=1; targetentry, |
|    |     <route1>;index=1.1 |
| m3 | INVITE route2 |
|    | History-Info: |
|    |     <target1>;index=1; targetentry, |
|    |     <route1>;index=1.1 |
|    |     <route2>;index=1.1.1 |
| m4 | INVITE target2 |
|    | History-Info: |
|    |     <target1>;index=1; targetentry, |
|    |     <route1>;index=1.1 |
|    |     <route2>;index=1.1.1 |
|    |     <target2>;index=1.1.1.1;targetentry |
| m5 | INVITE route3 |
|    | History-Info: |
|    |     <target1>;index=1; targetentry, |
|    |     <route1>;index=1.1 |
|    |     <route2>;index=1.1.1 |
|    |     <target2>;index=1.1.1.1;targetentry |
|    |     <route3>;index=1.1.1.1.1 |

In another History-Info header embodiment, an example the signalling sequence according to FIG. 2 is as follows:

| m1 | INVITE |
| --- | --- |
|    | target1 |
| m2 | INVITE route1 |
|    | History-Info: |
|    |     <target1>;index=1; targetentry, |
|    |     <route1>;index=1.1 |
| m3 | INVITE route2 |
|    | History-Info: |
|    |     <target1>;index=1; targetentry, |
|    |     <route1>;index=1.1 |
|    |     <route2>;index=1.1.1 |
| m4 | INVITE target2 |
|    | History-Info: |
|    |     <target1>;index=1; [Note the target entry tag has been removed] |
|    |     <route1>;index=1.1 |
|    |     <route2>;index=1.1.1 |
|    |     <target2>;index=1.1.1.1;targetentry |
| m5 | INVITE route3 |
|    | History-Info: |
|    |     <target1>;index=1; |
|    |     <route1>;index=1.1 |
|    |     <route2>;index=1.1.1 |
|    |     <target2>;index=1.1.1.1;targetentry |
|    |     <route3>;index=1.1.1.1.1 |

Figure 3:
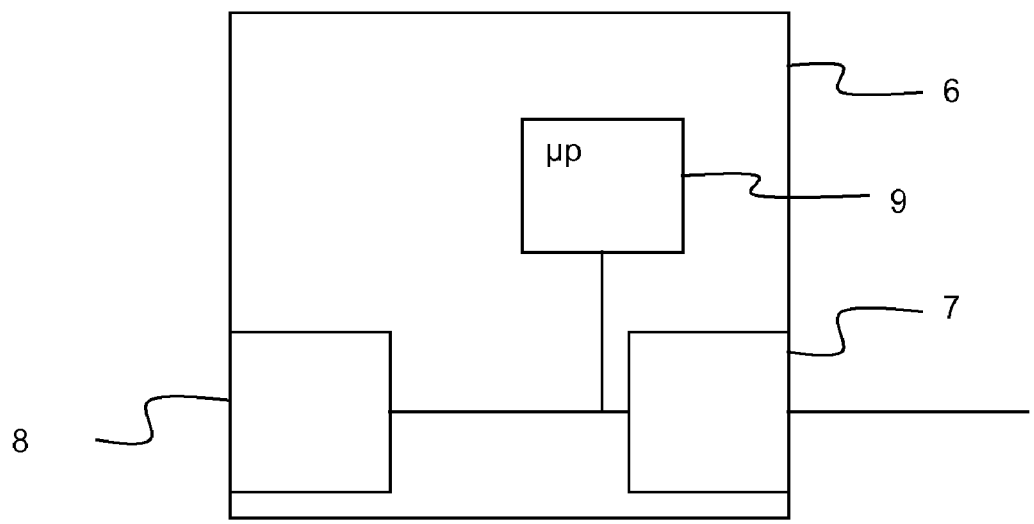
FIG. 3 illustrates schematically in a block diagram an intermediate node in a SIP signalling path according to an embodiment of the invention.

Referring to FIG. 3, there is illustrated schematically a node for use in a communications network. The node 6 could be, for example, a SIP proxy node in an IMS network, such as a CSCF. The node 6 has a receiver 7 for receiving a SIP message, and a processor 9 for rewriting the Request-URI header in the SIP message and adding information (either a new target header or tagging entries in the History-Info header as described above). The node further comprises a transmitter 8 for transmitting the SIP message to a further node.

Figure 4:
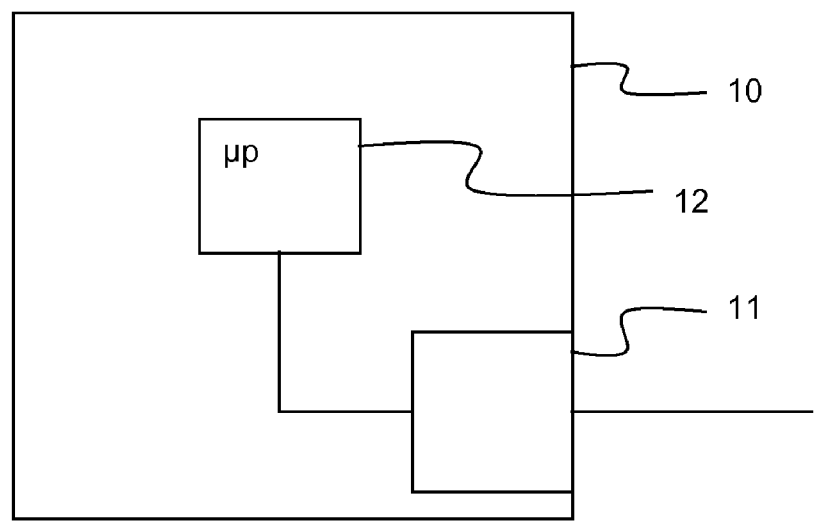
FIG. 4 illustrates schematically in a block diagram a terminating node according to an embodiment of the invention.

Referring to FIG. 4, there is illustrated schematically a terminating node, such as a UE. The terminating node 10 comprises a receiver 11 for receiving a SIP message, and a processor 12 for determining whether the contents of the Request-URI header included in the received SIP message are different from the contents of the Request-URI of the message as originally sent. In this way the terminating node can determine the original target address, and use this for executing policies on behalf of the user or services to the user.

EXAMPLES

The following are examples of how the new Target header described above can be used. However, the extended History-Info usage could be used in the following examples in a similar manner.

1. Unknown Aliases:

A single UA may have multiple AoRs associated with it, for example to use as aliases. It would be desirable for the recipient of a call to know which alias the call was addressed to. The P-Called-Party-ID header field (RFC3455) was introduced to address the scenario of unknown aliases, and the new Target header field would also address this issue.

2. Unknown Globally Routable User Agent URI (GRUU)

A GRUU is a URI assigned to a UA which has many of the same properties as the AoR, but causes requests to be routed only to that specific instance. In some circumstances it may be desirable for a recipient of a call to know whether the call was addressed using its GRUU or its AoR. This is a variant of the "Unknown Aliases" problem, and is addressed by RFC3455. The new Target header field also solves this issue for GRUU's used as initial target.

3. Limited Use Addresses

A limited use address is a SIP URI that is created and provided to a UA on demand. Incoming calls are only accepted whilst the UA desires communications addressed to that URI. Limited use addresses are used in particular to combat voice spam. This is another variant of the "Unknown Aliases" problem, and is addressed by RFC3455. The new Target header field also solves this issue.

4. Sub-Addressing

A sub-address is an address within a sub-domain that is multiplexed with other sub-addresses into a single address with a parent domain. This is used, for example, by employees of small companies, or family groups that wish to have separate sub-addresses by which they can be contacted. The sub-addressing feature is not currently available using SIP because a SIP URI parameter used to convey the sub-address would be lost at the home proxy, due to the fact that the Request-URI is rewritten there. This problem is overcome using the new Target header field.

5. Service Invocation

A URI can be used to address a service within the network rather than a subscriber. The URIs can include parameters that control the behaviour of the service. However, when a proxy has re-written the Request-URI to point to the service, there is no guarantee that the Request-URI will not be re-written by a further proxy in the signal path. The new Target header field would solve this scenario as it will retain the original complex URI, containing all the service invocation information.

6. Emergency Services

A key requirement of systems supporting emergency calling is that a SIP INVITE request for an emergency call is 'marked' in some way to ensure that the network knows that the SIP INVITE relates to an emergency call, and accord a priority to the SIP signalling. To avoid abuse by attackers, the marking is applied to the target address of the request itself. This mechanism will not work if any of the proxies along the way try to rewrite the Request-URI for the purposes of directing the call to a proxy or UA that will handle the call. However, the new Target header field solves this scenario as it will retain the emergency URN.

7. Freephone Numbers

Freephone numbers allow a user to call a number without being charged. If an intermediate node in the signalling path re-writes the Request-URI, a charging function may not recognize that the user should not be charged for the call. The new Target header field would solve this scenario as it retains the Freephone Number.

Whilst beyond the scope of this specification, it should be noted that the invention reveals to the UA the target address used to contact the UA, which was previously hidden. There may be circumstances in which it would be undesirable to reveal this information to the UA, in which case the home proxy should remove the header (or other indication) containing the target address.

The invention allows corporate networks and receiving UEs to know under which target identity a request was forwarded. Only the relevant target identity need be retained, and not a history of Request URI rewrites. This improves the efficiency of bandwidth usage and processing. Furthermore, the invention does not interfere with the existing routing mechanism and is compatible with home proxies that do not support loose routing. There is no need for entities using the mechanism to have knowledge whether the next hop supports it, and there is no need for the terminating UA to inform its home proxy whether it supports the mechanism or not. The invention does not require the terminal to support loose routing, and so is backwards compatible. In a scenario in which one of the traversed proxies does not understand the mechanism, routing will still succeed as the routing mechanism of SIP itself is not changed. The worst thing that can happen is that a terminating UA might receive incorrect information about the intended target identity by which it has been reached. The Target header might carry information identifying a forwarding party, where the forwarding party does not want to reveal its identity.

The invention is fully backward compatible with MGCFs that use the Request-URI value for mapping and routing towards a PSTN network, according to the interworking procedures described in RFC3398, 3GPP TS 29.163 and ITU-T Recommendation Q.1912.5.

It will be appreciated by the person of skill in the art that various modifications may be made to the embodiments described above without departing from the scope of the present invention. For example, many of the examples provided above use IMS as an example network, but it will be appreciated that the invention applies to any communications network that uses SIP signalling.

The invention claimed is:

1. A method of handling a Session Initiation Protocol message in a communications network, the method comprising:
   at a node in the network, receiving a Session Initiation Protocol message, the Session Initiation Protocol message comprising a Request-URI header;
   rewriting the Request-URI header in the Session Initiation Protocol message, wherein
      in the event of the rewriting being caused by a rerouting or translation operation, adding information to the Session Initiation Protocol message, the information identifying a target address prior to the rewriting, and
      in the event of the rewriting being caused by a retarget operation,
         determining whether information identifying a target address prior to rewriting from a previous rewriting operation is present in the message and, if so, replacing the information identifying the target address with the target address after the rewriting,
         adding a tag associated with an entry in a History-Info header of the message, the tag indicating that the entry arose from a re-target operation,
         removing existing taps associated with a previous target address entered in the History-Info header, and
         associating a tag with the current target address entered in the History-Info header; and
      sending the Session Initiation Protocol message to a further node.

2. The method according to claim 1, wherein the added information comprises a new message header.

3. An intermediate node for use in a communications network, the node comprising:
   a receiver for receiving a Session Initiation Protocol message;
   a processor for-rewriting a Request URI header In the Session Initiation Protocol message and in the event of the rewriting being caused by a rerouting or translation operation, adding information to the Session Initiation Protocol message the information identifying the target address prior to the rewriting, and in the event of the rewriting being caused by a retarget operation, determining whether information identifying a target address prior to rewriting from a previous rewriting operation is present in the message and, if so, replacing the information identifying the target address with the target address after the rewriting, and adding a tag to an address entry in a History-Info header of the message, the tag indicating that the entry arose from a re-target operation, and removing existing tags associated with a previous target address entered in the History-Info header, and associating a tag with the current target address entered in the History-Info header; and a transmitter for sending the Session Initiation Protocol message to a further node.

4. The intermediate node according to claim 3 wherein the processor is arranged to insert a new message header in the Session Initiation Protocol message, the header including the current target identity.

* * * * *

UNITED STATES PATENT AND TRADEMARK OFFICE
CERTIFICATE OF CORRECTION

| | | |
|---|---|---|
| PATENT NO. | : 8,230,109 B2 | Page 1 of 1 |
| APPLICATION NO. | : 12/811627 | |
| DATED | : July 24, 2012 | |
| INVENTOR(S) | : Van Elburg et al. | |

It is certified that error appears in the above-identified patent and that said Letters Patent is hereby corrected as shown below:

On the Face Page, in Field (56), under "OTHER PUBLICATIONS", in Column 2, Line 1, delete "protecol" and insert -- protocol --, therefor.

On the Face Page, in Field (56), under "OTHER PUBLICATIONS", in Column 2, Line 12, delete "Engneering" and insert -- Engineering --, therefor.

In Column 2, Line 37, delete "address" and insert -- address; --, therefor.

In Column 6, Line 59, delete "required" and insert -- required; --, therefor.

In Column 10, Line 41, in Claim 1, delete "taps" and insert -- tags --, therefor.

In Column 10, Line 54, in Claim 3, delete "In" and insert -- in --, therefor.

Signed and Sealed this
Twenty-seventh Day of November, 2012

David J. Kappos
*Director of the United States Patent and Trademark Office*